United States Patent [19]

Mintzberg

[11] Patent Number: 5,696,996

[45] Date of Patent: Dec. 9, 1997

[54] DISPOSABLE CAMERA WITH COMPOSITE IMAGE FORMING MEANS

[76] Inventor: Marc P. Mintzberg, 3524, avenue du Musée, Montreal, Quebec, Canada, H3G 2C7

[21] Appl. No.: 674,527

[22] Filed: Jul. 2, 1996

[51] Int. Cl.$^6$ ................................................ G03B 17/24
[52] U.S. Cl. ........................... 396/6; 396/316; 396/322
[58] Field of Search ........................... 396/6, 316, 318, 396/322, 340

[56] References Cited

U.S. PATENT DOCUMENTS

| | | |
|---|---|---|
| 1,360,414 | 11/1920 | Kuo ............................................ 396/316 |
| 3,478,657 | 11/1969 | Michels ........................................ 396/316 |
| 3,916,423 | 10/1975 | Ueda et al. ................................... 396/316 |
| 4,268,144 | 5/1981 | Wheeler . |
| 4,717,930 | 1/1988 | Wheeler . |
| 4,816,848 | 3/1989 | Doyle, Jr. . |
| 4,894,671 | 1/1990 | Wheeler . |
| 5,038,161 | 8/1991 | Ki . |
| 5,126,773 | 6/1992 | Ono et al. .................................... 396/316 |
| 5,144,348 | 9/1992 | DiSanzo et al. . |
| 5,187,512 | 2/1993 | Kirkendall ....................................... 396/6 |
| 5,249,008 | 9/1993 | Mauchan . |
| 5,471,268 | 11/1995 | Jeong et al. . |

Primary Examiner—A. A. Matthews
Attorney, Agent, or Firm—Oblon, Spivak, McClelland, Maier & Neustadt, P.C.

[57] ABSTRACT

A camera and more particularly, but not exclusively, a disposable camera has an exposure chamber therein which defines an aperture over which an exposable film strip is displaced to expose an image of a subject being photographed. A transparent film member, provided with one or more predetermined images thereon, is disposed against this aperture whereby to expose in superimposition on a film frame of the exposable film strip a composite image which is comprised of the subject being photographed in combination with the one or more predetermined images on the transparent film member.

10 Claims, 3 Drawing Sheets

1

DISPOSABLE CAMERA WITH COMPOSITE IMAGE FORMING MEANS

TECHNICAL FIELD

The present invention relates to a camera and more particularly, but not exclusively, a disposable camera having a transparent film member disposed over the aperture of the internal exposure chamber of the camera whereby to expose in superimposition on a film frame of the exposable film strip a composite image.

BACKGROUND ART

In my corresponding U.S. application filed on Jun. 18, 1996, and entitled "Camera With Composite Image Modifying Means", there is disclosed a camera which incorporates therein a transparent carrier member having one or more predetermined images which can be located adjacent the aperture of the exposure chamber of a camera and changed by the user from outside the camera housing.

Examples of composite image forming film packs are also described in U.S. Pat. Nos. 4,816,848, 5,249,008, 4,268,144 and 4,894,671. It is therefore known in the prior art to provide film packs for instant cameras wherein a message is preprinted on an overlay sheet in the film pack and when a natural subject is photographed the message will be transferred to the light-sensitive photograph sheet and appear with the subject. It is also known from U.S. Pat. No. 5,038,161 to construct a camera wherein a primary and a secondary film is provided in the camera with a dark mask figure located against the primary film to prevent the primary film from being exposed in the area of the dark mask figure. This dark mask figure co-acts with a like contour figure contained on a film and exposed on the exposable film strip to produce a composite image with the subject being photographed.

In U.S. Pat. No. 5,471,268, there is disclosed a data display plate and a rigid carrier mounting the plate therein. The data consists of simple characters and dates that are printed on the photograph by the use of a light emitting diode to accomplish the exposure. A mask support member is also utilized to receive light emitted by the diode.

In all of the prior art, the creation of composite images on a film strip is complex and requires special modifications to existing cameras. There is therefore a need to provide a simple, economical disposable camera in which there is incorporated a film frame with one or more images to be superimposed on a film frame of a regular film strip together with a subject being photographed whereby to produce a composite image.

SUMMARY OF INVENTION

A feature of the present invention is to provide such a disposable camera capable of fulfilling the above-mentioned need.

According to another feature of the present invention there is provided a disposable camera wherein a transparent film member having one or more predetermined images is secured against the aperture of the internal exposure chamber of the disposable camera whereby a composite image can be produced on an exposable film strip.

Another feature of the present invention is to provide a disposable camera in which the film canister is provided with an exposable film strip and a transparent film strip having a plurality of predetermined images which are juxtaposed to film frames of the exposable film strip to produce composite images on the frames of the exposable film strip.

Another feature of the present invention is to incorporate in a camera aperture a flexible transparent membrane having one or more predetermined images for superimposition on an exposable film strip and during shutter operation, and wherein the membrane is universally adaptable to different size apertures of different cameras and is in facial contact with the film strip, and further wherein the invention is substantially more economical as compared to the prior art.

According to the above features, from a broad aspect, the present invention provides a camera, and preferably but not exclusively, a disposable camera having therein an exposure chamber provided with an aperture over which an exposable film strip is displaced to expose an image of a subject being photographed. The improvement comprises a transparent film member, having one or more predetermined images thereon, and which is disposed against the aperture whereby to expose in superimposition on a film frame of the exposable film strip, a composite image comprised of the subject being photographed in combination with the one or more predetermined images.

BRIEF DESCRIPTION OF DRAWINGS

A preferred embodiment of the invention will now be described with reference to the accompanying drawings in which.

DESCRIPTION OF PREFERRED EMBODIMENTS

Figure 1:
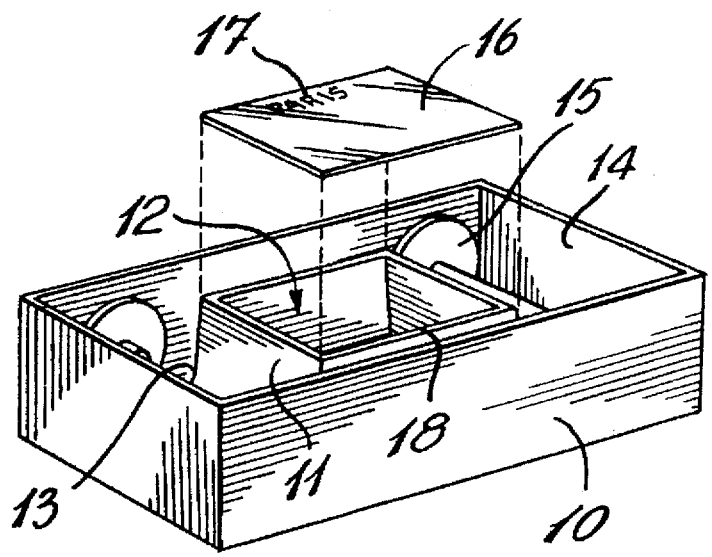
FIG. 1 is a perspective view showing a portion of a disposable camera, and partly in exploded view showing the positioning of a transparent film member over the aperture of an exposure chamber.

Referring now to the drawings and more particularly to FIG. 1, there is shown at 10 a disposable camera having therein an exposure chamber 11 provided with an aperture 12 in a rear end thereof. The exposure chamber is a rectangular chamber and a shutter and lens assembly is secured to a forward end thereof. The camera is provided with a cartridge cavity 13 at one end thereof and a take-up spool receiving cavity 14 at an opposite end thereof for retaining therein a take-up spool 15 as hereinshown. The improvement in the disposable camera 10 resides in the securement of a transparent film member 16 about the aperture 12, and on which there is exposed or otherwise printed one or more predetermined images 17. The transparent film member 16 is secured about the outer periphery 18 of the aperture 12 or at predetermined positions therealong.

Figure 2A:
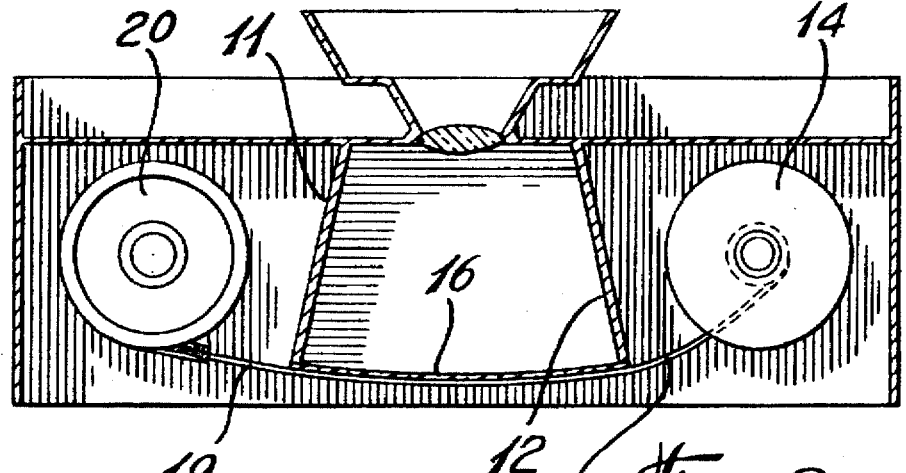
FIG. 2A is a simplified section view of a disposable camera showing the exposure chamber and the position of the transparent film member relative to the exposable film strip.
Figure 2B:
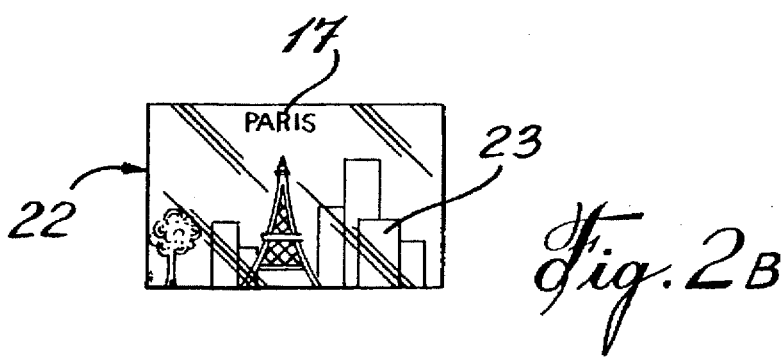
FIG. 2B is a plan view of a photograph taken with a disposable camera incorporating the present invention and on which the composite image is reproduced.
Figure 3:
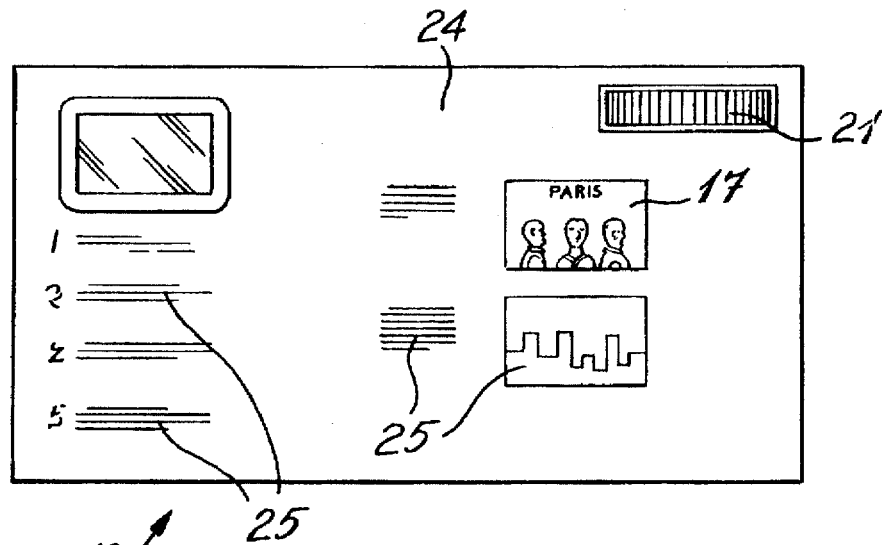
FIG. 3 is a rear view of a disposable camera housed in a cardboard housing.

As shown in FIG. 2, the transparent film strip 16 is disposed in facial contact with an exposable film strip 19 contained in a film canister 20 and displaced over the aperture 12, one frame at a time. The free end of the exposable film 19 is secured to the take-up spool 15. The spool 14 is rotatable by a take-up wheel 21 as shown in FIG. 3 and as is well known in the art. Accordingly, as shown in FIG. 2, the transparent film member 16 with its one or more predetermined images 17 is juxtaposed with a film frame of the exposable film 19 and when a subject is photographed the subject is exposed on the exposable film strip 19 in the area of the aperture 12 and the one or more images on the transparent film member 16 are also superimposed onto the film frame by the opening of the camera shutter whereby to produce a composite image 22, as shown in FIG. 2B, and which is comprised of the subject 23 being photographed together with the predetermined image 17.

As can be seen from FIG. 3, the disposable camera is located in a cardboard housing 24 on which may be printed instructional material 25 to indicate to a user person the nature of the one or more predetermined images 17 and how the camera can be used to produce composite images and further suggesting compositions.

Figure 4:
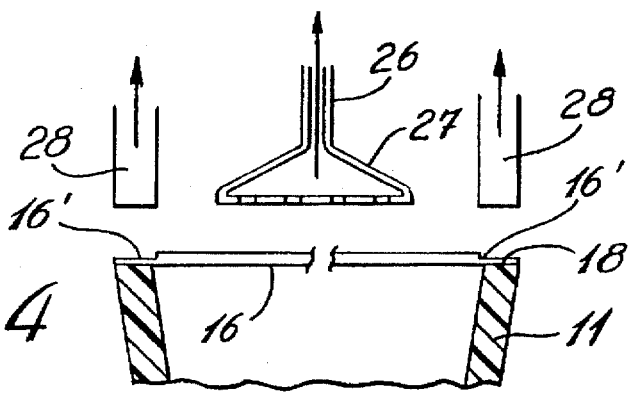
FIG. 4 is a simplified section view showing an example of the securement of a transparent film sheet about the aperture of the exposure chamber.

FIG. 4 shows how the transparent film member 16 may be secured to the outer periphery 18 about the aperture of the exposure chamber 11. As hereinshown the transparent film member 16 was automatically assembled about the periphery of the exposure chamber by a carrier member 26 which is comprised of a suction cup 27 capable of automatically transporting and positioning the transparent film member 16 in perfect alignment with the outer peripheral edge 18 of the exposure chamber. Fusing bars or fingers 28 are brought into registry with a peripheral edge portion 16' of the transparent film member 16 whereby to fuse them to the outer peripheral edge 18 of the exposure chamber 11. The fusing bars 28 and the carrier member 26 are then retracted. It can be appreciated that with this type of assembly apparatus the transparent film member may be transferred over the aperture of the exposure chamber and secured thereto very quickly in an automatic camera assembly machine.

Figure 5:
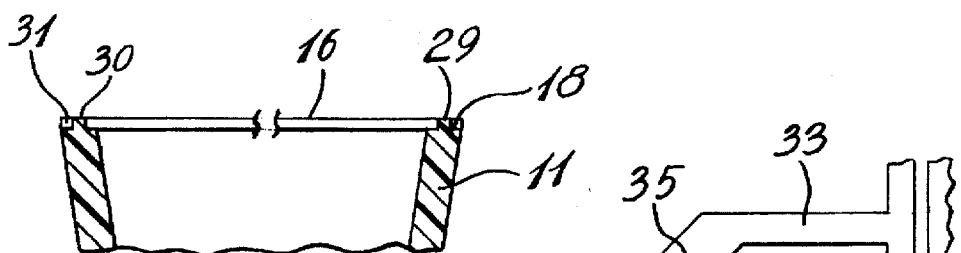
FIG. 5 is a further simplified section view illustrating another example of the securement of the transparent film member over the aperture of the exposure chamber.

Referring now to FIG. 5, there is shown another manner of securing the transparent film member about the outer peripheral edge 18 of the exposure chamber 11. As hereinshown the outer periphery 18 is provided with locating prongs 29 disposed at predetermined locations about at least portions of the outer peripheral edge 18. Locating apertures 30 are provided at predetermined locations adjacent a periphery 31 of the transparent film member 16 and positioned to receive associated ones of the prongs 29 for retention of the film sheet over the aperture. Again, this transparent film member 16 may be transferred over the aperture of the exposure chamber 11 by automatic means and the prong end could then be fused.

Figure 6:
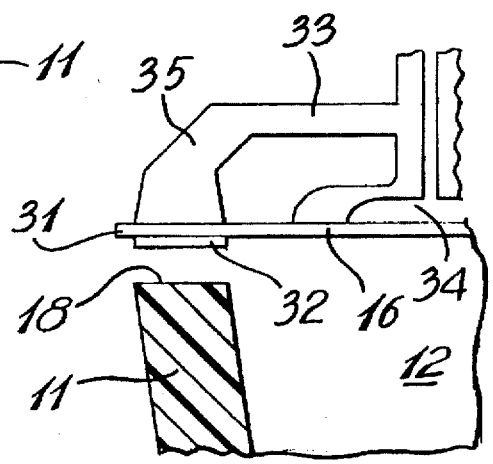
FIG. 6 is a schematic view showing a method of securing the transparent film member over the aperture of an exposure chamber of the disposable camera.
Figure 7:
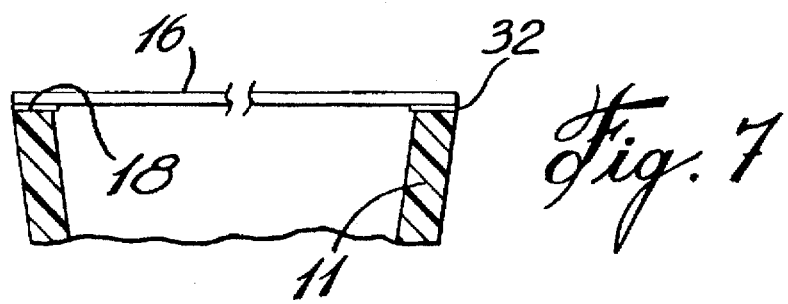
FIG. 7 is a simplified section view showing the transparent film member glued about the periphery of the exposure chamber.

FIG. 6 shows a still further example of how the transparent film member 16 is permanently secured over the outer peripheral edge 18 of the exposure chamber 11. As hereinshown the transparent film member 16 is provided with a contact glue strip 32, or other suitable type of glue strip, such as a double-sided adhesive, at predetermined locations adjacent the outer periphery 31 or all along thereof. The transfer member 33 as hereinshown is also provided with a vacuum chamber 34 and with press arms 35. As the transparent film member 16 is transferred in registry with the outer peripheral edge 18 of the aperture 12, the legs 35 apply pressure to bond the transparent film strip 16 to the peripheral edge 18. FIG. 7 shows the film strip 16 bonded by the glue 32 to the peripheral edge 18 of the exposure chamber 11.

Figure 8:
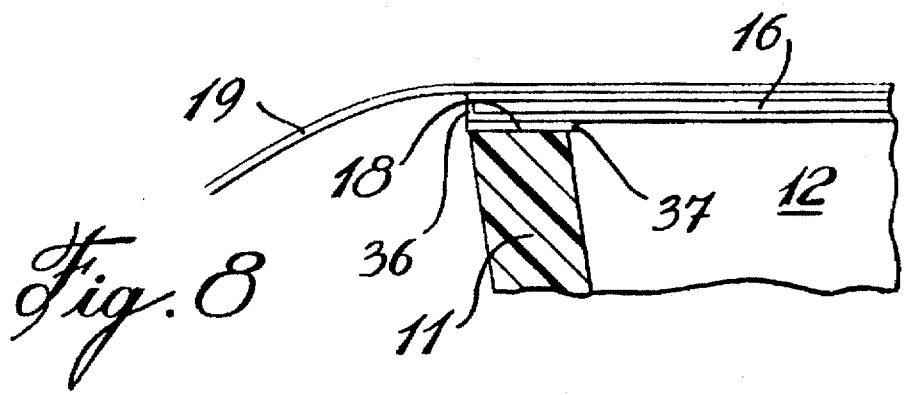
FIG. 8 is an enlarged view showing another manner in which the transparent film member may be secured about the aperture of the exposure chamber.

FIG. 8 shows a still further manner in which the transparent film member 16 may be permanently secured over the aperture 12. As hereinshown, the transparent film member 16 is slidingly retained in a cartridge frame 36 which is a U-shaped frame having an open edge to permit insertion of the transparent film member 16 therein. The cartridge frame 36 is then transferred and adhesively secured by the adhesive 37 to the peripheral edge 18 of the exposure chamber 11.

Figure 9:
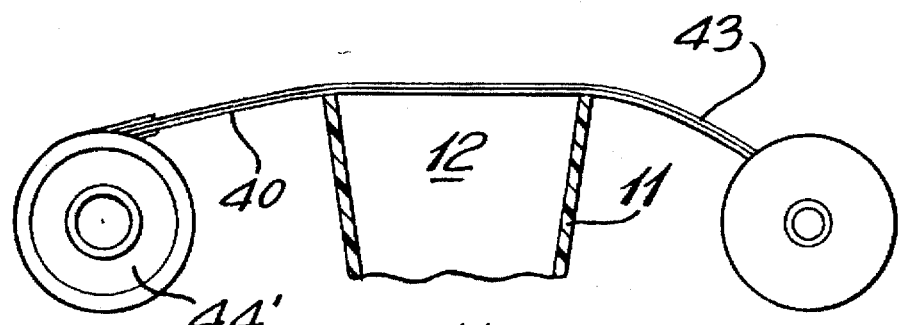
FIG. 9 is an enlarged view showing a transparent film strip juxtaposed with an exposable film strip and both contained in a film canister.
Figure 10:
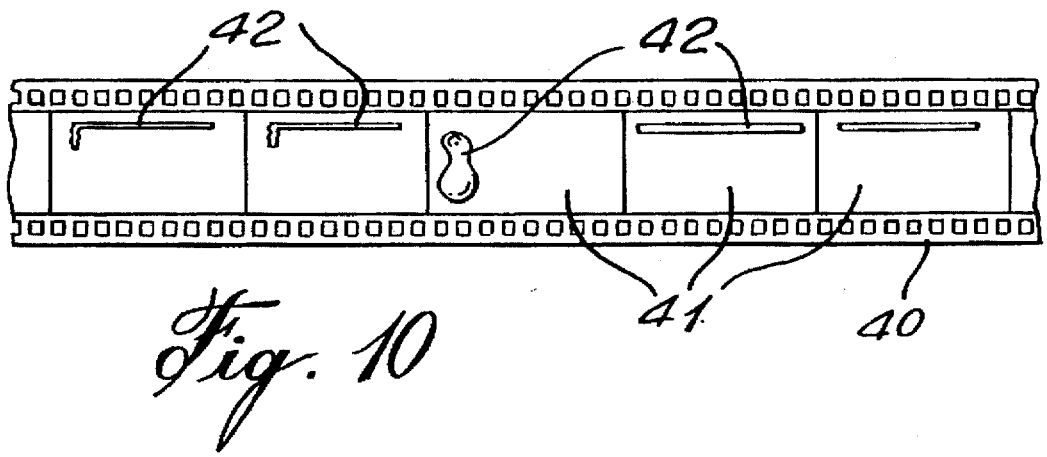
FIG. 10 is a plan view of a section of a transparent film strip having one or more predetermined images thereon.

Referring now to FIGS. 9 and 10, there is shown a further method of permanently disposing one or more predetermined images of a transparent film member in registry with the aperture 12 of the exposure chamber 11. As hereinshown a transparent film strip 40 is provided with a plurality of transparent exposure frames 41, see FIG. 10, each of which carries one or more predetermined images 42. The transparent film strip 40 is wound with the film strip about a spool 44' positioned within the disposable camera housing. These juxtaposed films are then wound in a canister 44 during picture taking. It is important during camera assembly to align the first frame of the transparent film with the camera aperture so that both the transparent film strip and the exposable film strip can be advanced in unison and in synchronism whereby the successive frames or the transparent film strip are positioned in registry with the aperture 12 of the exposure chamber 11. To achieve this, it is preferable to secure the films together and this can be done by fusing a section of the juxtaposed film strips near their free take-up end positioned with the canister 44. This type of composite film cartridge needs to also be precisely mounted in the disposable camera whereby the first frame to be exposed is properly aligned with the exposure chamber aperture.

Although the present invention has been described with emphasis as to its use with disposable cameras, it is to be understood that it can be adapted to any type of camera having therein an exposure chamber provided with an aperture.

It is within the ambit of the present invention to cover any obvious modifications of the preferred embodiment described herein, provided such modifications fall within the scope of the appended claims.

I claim:

1. A single-use disposable camera having therein an exposure chamber provided with an aperture over which an exposable film strip is displaced to expose an image of a subject being photographed, the improvement comprising a transparent film member having one or more predetermined images thereon and immovable secured over said entire aperture and in contact with said film strip whereby to expose in superimposition on a film frame of said exposable film strip a composite image comprised of an exposure of said subject being photographed in combination with said one or more predetermined images, said one or more predetermined images being integrated with said exposure of said subject without masking a portion of said aperture whereby said subject can be exposed in said entire film frame.

2. A disposable camera as claimed in claim 1 wherein said transparent film sheet is secured to at least a portion of an outer periphery of said aperture by glue.

3. A disposable camera as claimed in claim 1 wherein said transparent film sheet is secured to at least an outer periphery of said aperture by fusion to develop a bond therewith.

4. A disposable camera as claimed in claim 1 wherein said transparent film sheet is secured to at least an outer periphery of said aperture by locating prongs disposed at predetermined locations about at least an outer periphery of said aperture, said transparent film sheet having locating apertures at predetermined locations adjacent a periphery thereof and positioned to receive associated ones of said prongs therein for retention of said film sheet over said aperture.

5. A disposable camera as claimed in claim 1 wherein said transparent film sheet is secured to at least an outer periphery of said aperture by a double-sided contact adhesive strip secured on one side adjacent at least portions of a periphery of said film sheet and on the other side to at least portions of an outer periphery of said aperture.

6. A disposable camera as claimed in claim 1 wherein said transparent film sheet is a rectangular sheet slidingly retained in a cartridge frame, said cartridge frame being permanently secured to an outer periphery of said aperture.

7. A disposable camera as claimed in claim 1 wherein said disposable camera is further provided with visual instructional material to indicate to a user person the nature of said one or more predetermined images and their position relative to said composite image.

8. A disposable camera as claimed in claim 4 wherein said locating prongs have fused free ends to prevent disconnection of said transparent film sheet from about said aperture.

9. A single-use disposable camera having therein an exposure chamber provided with an aperture over which an exposable film strip is displaced to expose an image of a subject being photographed, the improvement comprising a transparent film member having one or more predetermined images thereon and disposed against said aperture whereby to expose in superimposition on a film frame of said exposable film strip a composite image comprised of said subject being photographed in combination with said one or more predetermined images, said transparent film member being a transparent film strip having a plurality of transparent exposure frames, each said transparent exposure frame carrying said one or more predetermined images, said transparent film strip being positioned in facial juxtaposed relationship with an exposable film strip also housed in said canister.

10. A disposable camera as claimed in claim 9 wherein said transparent film strip is secured to said exposable film strip, both said film strips being prewound on a spool of said disposable camera and fed into a film canister during use.

* * * * *